(No Model.)  2 Sheets—Sheet 1.
F. W. LEVERING.
MIRROR.
No. 365,264.  Patented June 21, 1887.
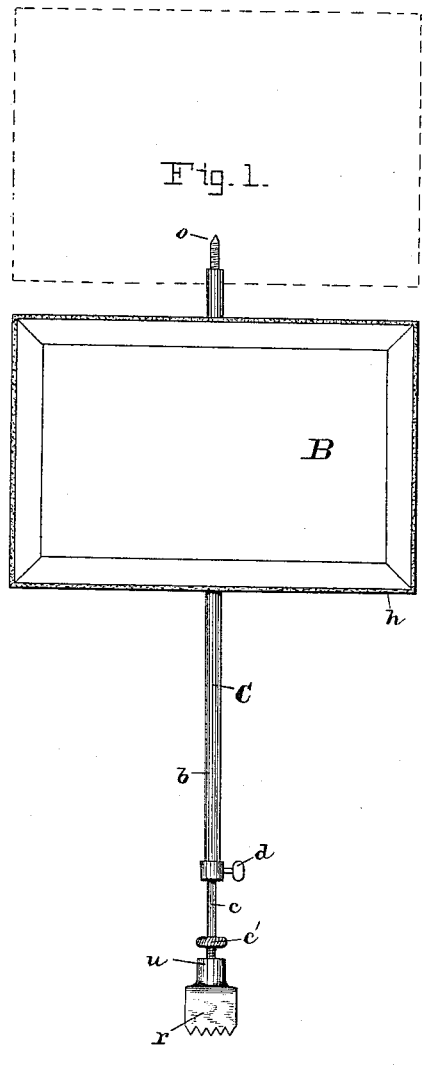
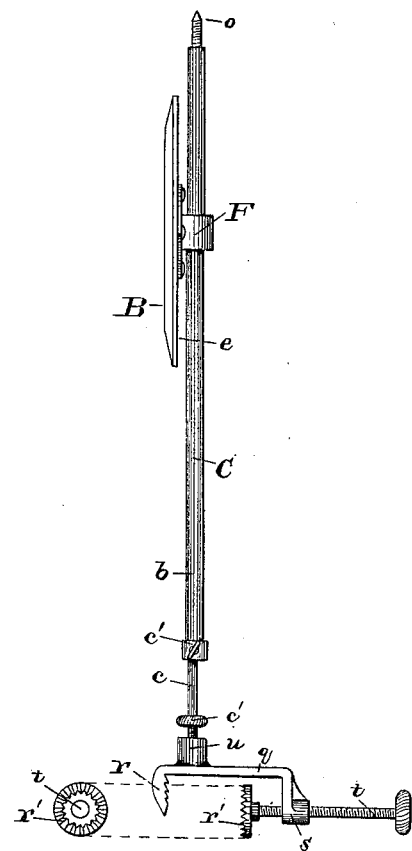
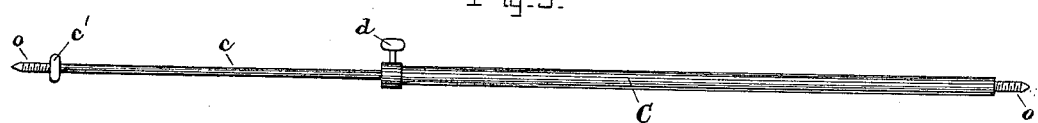
WITNESSES:
John E. Morris
A. C. Eader
INVENTOR:
Franklin W. Levering
BY Chas B. Mann
ATTORNEY.

(No Model.) 2 Sheets—Sheet 2.
F. W. LEVERING.
MIRROR.
No. 365,264. Patented June 21, 1887.
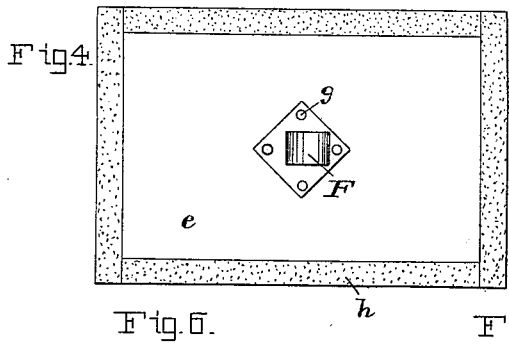
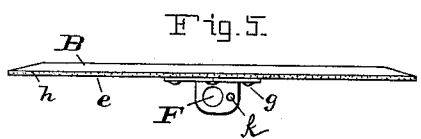
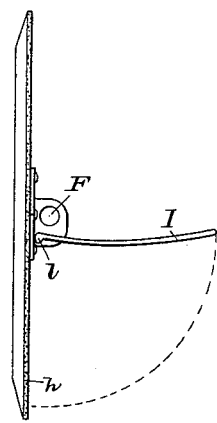
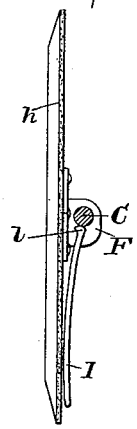
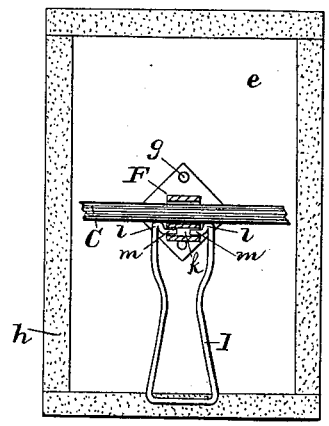
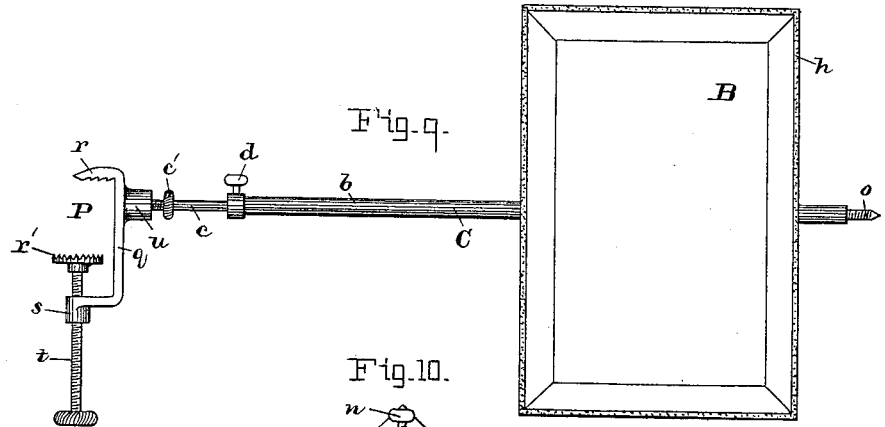
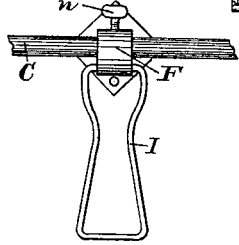
WITNESSES:
John E. Morris
A. E. Eader
INVENTOR:
Franklin W. Levering
BY Chas B. Mann
ATTORNEY.

UNITED STATES PATENT OFFICE.

FRANKLIN W. LEVERING, OF BALTIMORE, MARYLAND.

MIRROR.

SPECIFICATION forming part of Letters Patent No. 365,264, dated June 21, 1887.

Application filed March 17, 1887. Serial No. 231,221. (No model.)

*To all whom it may concern:*

Be it known that I, FRANKLIN W. LEVERING, a citizen of the United States, residing at Baltimore, in the State of Maryland, have invented certain new and useful Improvements in Supports for Mirrors, of which the following is a specification.

My invention relates to certain improvements in adjustable supports for mirrors, which are illustrated in the accompanying drawings, in which—

Figure 1 is a front, and Fig. 2 a side, view of a mirror and the supporting-bar, wherein the latter has a vertical position. Fig. 3 is a side view of the extensible supporting-bar. Fig. 4 is a back view, and Fig. 5 an edge view, of the mirror with the bar-clamping eye attached at the center of the back. Figs. 6, 7, and 8 are views of the mirror, showing in detail the relation of the handle and supporting bar. Fig. 9 is a front view of the mirror and supporting bar, wherein the latter has a horizontal position. Fig. 10 is a view of the handle and bar-clamp.

The glass mirror B has a thin back, $e$, which may consist of wood, metal, pasteboard, or any suitable material. In manufacturing this article the clamping-eye F is first attached to the back $e$ by rivets $g$, and said back is then secured to the glass B by a strip of paper or cloth, $h$, folded over the edge of both the back and glass, and forming an edge-binding. The back may be secured to the glass, however, in any suitable way.

The clamp-eye consists of a boss with a round hole, F, through it, and has a handle, I, consisting of wire or other suitably-formed material, pivoted to it and adapted to serve as a grasp for a person's hand to support the mirror in the fashion of an easel, and also as a tightener or gripper for a supporting-bar, C, which has position through the said round hole. The boss of the clamp-eye also has a pivot-hole, $k$, whereto the said handle I is attached. The supporting-bar C is preferably round, and when the eye or hole F is round the bar must necessarily be round. It may be stated, however, that both the eye or hole and the bar may be of other shape. The bar C in the eye is free to move endwise; but when set at any desired point the said bar may be held from moving by the cam ends $l$ of the handle I pressing against the bar, as seen in Figs. 7 and 8. The handle I has pivot-prongs $m$, which enter the pivot-hole $k$ in the clamp-eye boss. This mode of attachment leaves the handle free to turn on said pivots. The cam ends $l$ consist of short lugs which project beyond the pivots $m$.

It will be seen that when the free end of the handle I is turned away from the mirror-back $e$, as shown in Fig. 6, the bar C will be loose in the eye, and may be moved therein or entirely withdrawn; but when the handle is turned to the position shown in Figs. 7 and 8 the said cam-lugs $l$ will impinge on the bar and prevent it from moving.

If desired, a set-screw, $n$, may be employed in the clamp-eye boss for preventing the bar C from moving in the eye or hole F.

The supporting-bar C may be a single bar, non extensible, or it may consist of two bars united and constructed in any suitable way to be extensible longitudinally of each other. In the present instance the two-part bar comprises a tube, $b$, and a rod, $c$, movable within the tube, while a set screw, $d$, at the end of the tube has its end impinging against the rod, so as to hold the said two parts at any position to which they may be extended. The bar has pointed ends $o$, which, if desired, may be pressed into the opposite sides of a window-sash or other structure, and thereby serve to retain it and support the mirror. These ends, besides being pointed, are screw-threaded. The rod $c$ has a grip-head, $c'$, by which it may be turned and also extended.

In order that the supporting-bar C and mirror B on the bar may be sustained by the edge of a mantel-piece, shelf, table, chair-back, or other article of furniture, I provide a special clamp, P. This clamp has a back bar, $q$, at one end of which is a right-angled jaw, $r$, and at the other end a right-angled head, $s$, having a tap or screw-threaded hole through it. A threaded bolt, $t$, passes through said hole, and carries at its end a swiveled jaw, $r'$. It will be seen this device is adapted to clamp the edge of a shelf, table, or other article for supporting it. The back bar, $q$, of the clamp has a screw-threaded socket, $u$, situated intermediate of the two ends, into which either end $o$ of the supporting-bar C may be screwed, as shown in Figs. 1, 2, and 9. By means of this device the supporting-bar C may take a vertical or a horizontal position; or, indeed, any position to suit the place of attachment of the clamp.

This device is of the same character, but is an improvement on that shown and described in Letters Patent of the United States, No. 340,968, granted me April 27, 1886.

Having described my invention, I claim and desire to secure by Letters Patent of the United States—

1. In combination, the mirror B, having at its back a clamp-boss provided with an eye or hole, a detachable supporting-bar, C, to have position in said eye or hole, a handle, I, separate from said supporting-bar, pivoted to the clamp-boss, and having cam-lugs $l$ to impinge on the supporting-bar and prevent it from moving.

2. In combination, the mirror B, having at its back a clamp-boss provided with an eye or hole, a supporting-bar, C, through said eye or hole, and having screw-threaded ends, a clamp device on said boss to prevent the bar from moving, and a clamp comprising a back bar, $q$, having at one end a jaw, $r$, and at the other a screw-threaded head, $s$, carrying a threaded bolt, $t$, and provided intermediate of said two ends with a screw-threaded socket, $u$, as set forth.

In testimony whereof I affix my signature in the presence of two witnesses.

FRANKLIN W. LEVERING.

Witnesses:
   JOHN E. MORRIS,
   JNO. T. MADDOX.